2,900,222

INHIBITING CORROSION

Harry L. Kahler, Feasterville, and William A. Tanzola, Havertown, Pa., assignors, by mesne assignments, to Betz Laboratories, Inc., a corporation of Pennsylvania No Drawing. Application March 8, 1954
Serial No. 414,872

8 Claims. (Cl. 21—2.7)

The present invention relates to improved corrosion treating compositions and processes for applying the same.

The subject matter relating to cadmium is embodied in our copending application for Inhibiting Corrosion, Serial No. 791,245, filed January 13, 1959.

The new compositions of the present invention are particularly effective for inhibiting or preventing corrosion in systems where water is the corroding medium. The invention is applicable for the protection of iron and steel parts of industrial water systems, and also for the protection of other metals such as copper, copper base alloys, aluminum and aluminum base alloys which are in contact with such corroding media.

A purpose of the invention is to obtain effective protection of metal parts in an industrial water system by the use of an economical treatment which will involve a minimum of chemical additions.

A further purpose is to secure effective protection of metal parts in an industrial water system by applying a coating to the metal.

A further purpose is to introduce a water soluble zinc compound in the presence of a water soluble chromate and a water soluble phosphate which may permissibly be a complex phosphate, an orthophosphate or a mixture of complex phosphate and orthophosphate.

A further purpose is to secure corrosion protection in an industrial water system of the character described in which the zinc remains in a soluble state in the presence of water soluble chromate and water soluble phosphate.

A further purpose is to employ zinc or orthophosphate at a level in excess of their solubility expressed as a zinc compound such as $Zn_3(PO_4)_2$. The orthophosphate may be provided as an actual addition or as a reversion product from complex phosphate. With oversaturation of zinc and orthophosphate their precipitation takes place as a highly insoluble salt which is adherent to metallic and other parts of the water system and protective.

Further purposes appear in the specification and in the claims.

When reference is made herein to chromate, it is intended to refer to water soluble compounds that provide chromium in the hexavalent form, as later explained.

When reference is made herein to orthophosphate, it is intended to designate all water soluble orthophosphates, as later explained. When reference is made herein to complex phosphates, it is intended to designate the sodium polyphosphates which have in the case of the sodium salts a molecular ratio of $Na_2O$ to $P_2O_5$ between 1 to 1 and 2 to 1 and which are water soluble, as later explained.

The application of water soluble chromates in which the chromium is present in hexavalent form for inhibiting corrosion of metals in contact with water has been widely practiced, and its use has been successful when proper allowance has been made for its inherent weaknesses. Thus it is necessary that adequate concentrations be maintained. These concentrations are determined by the corrosion load, but they should not be below 200 p.p.m. (U. R. Evans, Metallic Corrosion, Passivity and Protection, 557). Below these recommended concentration levels, chromates may be actually harmful rather than beneficial (F. Todt, 40 Zeitsch. Electa-Chem. 536 (1934).

Except in the extremely high and completely protective levels of concentration, the use of phosphate is attended by undesirable pitting attack and tubercular growth. Water soluble phosphates such as orthophosphates and complex phosphates have been widely employed in corrosion protection. The orthophosphate has played a minor role because of its rather low corrosion inhibitory power and because it is susceptible to precipitation as a compound with calcium, thereby imposing a limitation on the amount of calcium which can be tolerated in the water system. The complex phosphates, on the other hand have a vastly greater effectiveness and have been very widely used. The power of complex phosphates has been employed over a considerable range of concentration from the so-called "threshold" level of 2 to 10 p.p.m. to a more recent use in the so-called high phosphate range of 40 to 100 p.p.m.

The use of complex phosphate in the "threshold" range has not been signally successful except where the water exhibits a low corrosion potential. Waters of this character are invariably susceptible to deposition of calcium carbonate and the complex phosphate functions primarily to sequester the calcium and prevent it from precipitating. When dealing with more corrosive waters, the use of "threshold" concentrations has shown little if any success. The higher complex phosphate level of 40 to 100 p.p.m. has produced much more effective corrosion inhibition. However, in spite of the improved behavior of the complex phosphates themselves, their tendency to revert to orthophosphate has required that they be used in reduced pH levels of 5.0 to 7.0 in order to provide sufficient calcium tolerance for normal waters. Even more important, however, the complex phosphate, though providing a measure of protection against general corrosion, exhibits pronounced tendency toward pitting, which has even reached serious proportions in a short time. For this reason, much effort has been made to reduce the inherent pitting property of complex phosphates, and compositions containing complex phosphates and additives to prevent or diminish pitting have come into use.

One of the present inventors has found that the corrosion protection from both the chromates and the phosphates, complex or ortho, or ortho and complex, can be improved by water soluble chromates and water soluble phosphates used in proper combinations. See U.S. patent application Serial No. 364,871, filed June 29, 1953, for Corrosion Protection in Water Systems, now United States Patent No. 2,711,391. The chromates and phosphates are used in select ratios and in select pH, and produce a vastly improved corrosion inhibition, possessing the inherent desirable properties of their components, along with elimination or minimization of their weaknesses. Thus the excellent weight-saving function of the chromate can be obtained with almost complete control of pitting.

While the above combination improves the corrosion inhibitory powers of chromates and phosphates in respect to pitting and general type corrosion, it is necessary to adjust the treatment concentration to meet the corrosion load. This is not possible in all cases, as, for example, where calcium content restricts the phosphate concentration, where the large volume of water precludes adequate treatment, or where the natural desire to reduce toxicity dictates reduction in the chromate concentration. These features are not deficiencies of the treatment but limitations on the application of the treatment previously developed.

The present inventors have discovered that these limitations and others encountered in the previous use of combined treatments with phosphate can be overcome by incorporating in the water a compound of zinc, which is water soluble at the time of feeding. The introduction of a water soluble zinc compound with phosphate-chromate mixtures develops improved powers of inhibiting and tends to make the new treatment capable of overcoming limitations previously encountered.

There are two methods in which the water soluble zinc compounds can be employed with combined phosphate chromate treatments. Each of these methods functions under different conditions and by different mechanisms. In the first of these methods, the compounds of zinc, and chromates and the phosphates must be in completely soluble form both in the treatment feed solution and in the main flow or treated water. The zinc retains its identity as an ion or soluble complex to relieve corrosion. It is necessary to control conditions such as pH and concentration of the possible precipitating ions in order to operate this method.

The other possible method of using zinc with phosphate-chromate is to produce an insoluble coating primarily in the form of zinc phosphate, but which may under certain conditions contain other insoluble salts of zinc, for example zinc hydroxide and the like. In this method the zinc and the phosphates are used in such concentrations that their solubility as a salt such as zinc phosphate, $Zn_3(PO_4)_2$ is exceeded and the excess is precipitated as a finely divided material on all of the metal surfaces of the industrial water system in contact with the corroding water, such as piping, tanks, drums, heat exchangers, and the like. The precipitating material produces a coating that forms a barrier to prevent or lessen the corrosive action against the metal.

Whether the protective system uses zinc as a coating or as a soluble ion or complex salt, we have found that the power of a given concentration of phosphate-chromate in protecting against corrosion can be greatly increased by the presence of the zinc, particularly the ability to resist intensive attack such as pitting. Thus a given degree of corrosion protection measured in metal loss can be obtained by using a decreased concentration of phosphate-chromate and adding zinc, and a higher degree of protection can be obtained due to the zinc.

Table 1 illustrates the benefits derived by adding zinc to a phosphate-chromate combination. These tests were performed on Philadelphia city water, a relatively soft type of water, to which were added 500 p.p.m. chloride ion to impose an added corrosion load. The phosphate concentration in the first column is in terms of p.p.m. of actophos, $Na_{12}P_{10}O_{31}$ having a 63.5 percent by weight of $P_2O_5$ and a pH of 7.2 in a water solution containing 1 percent by weight. The chromate concentration in the second column is in terms of p.p.m. of sodium dichromate; and the zinc concentration in the third column is in terms of p.p.m. of zinc ion added as zinc chloride (anhydrous). The table also gives average penetration in inches per year and observations of pH, tubercles and pits.

The apparatus used for the laboratory experiments was a continuous flowing experimental water system divided into two sections, one section of specimens receiving the water having the inhibitor and the other section of specimens receiving the control water. This system therefore permitted the testing of one control and one treatment experiment simultaneously or two controls or two treatment experiments. Down stream from the points of addition of the inhibitor, corrosion test specimens were exposed to the water. The flow rate used during the tests was 0.35 foot per second and the temperature was 120° F. The specimens were flat steel sheets having a composition of 0.9% carbon, 1.4% manganese, 0.04% sulphur, 0.3% silicon, no phosphorus, balance iron. Before exposure the specimens were resurfaced using a No. 80 grinding wheel to a machined surface of R.M.S. 20 micro inches roughness to allow accurate evaluation of pits. Before immersion the specimens were cleaned with tripoli (an abrasive) and trisodium phosphate, followed by an alcohol rinse. The oxygen in the test water was kept at 5 p.p.m. The specimens were evaluated at a magnification of 20 diameters.

In those cases where the phosphate-chromate treatment concentration was inadequate for the corrosion load, the addition of the zinc gave marked improvement. At a concentration level of 10 p.p.m. sodium tripolyphosphate and 5 p.p.m. sodium dichromate, general corrosion was controlled but some pitting prevailed. The addition of zinc fed as zinc chloride reduced this pitting tendency considerably.

At the very low level of 2 p.p.m. sodium tripolyphosphate and 1 p.p.m. sodium dichromate, general corrosion prevailed. The addition of 2 p.p.m. zinc (from zinc chloride) reduced the extent of such attack.

In the case of an industrial water system containing 60 p.p.m. of sodium tripolyphosphate and 30 p.p.m. of sodium dichromate, the treatment appeared to be adequate for the corrosion load and the effect of the zinc was to give supplemental protection thus adding to the safety factor.

Field tests have been made to determine the effectiveness of adding soluble zinc to the phosphate-chromate combination. These tests were experiments under actual plant conditions. In this case a treatment consisting of 20 to 30 p.p.m. of $PO_4$ fed as sodium tripolyphosphate and 18 to 27 p.p.m. of $CrO_4$ fed as sodium chromate was inadequate to meet the corrosion load. The inclusion of 5 percent zinc sulphate monohydrate (the concentration of zinc was 1.2 p.p.m.) by weight of the total added chemical vastly improved the corrosion inhibition, permitting a 20 percent by weight reduction in total treatment, and reducing the maintenance and replacement cost by 53 percent in the first year. A pH of 6 was maintained.

Table 2 illustrates the application of water soluble zinc compounds for increasing the power and scope of phosphate-chromate corrosion treatment wherein the zinc functioned to provide a physically protective coating. The treatment for this evaluatory test was selected because it had been unusually successful in an experimental field test under actual plant conditions. In the field test, the phosphate-chromate application prior to the addition of the zinc was not satisfactory because it was inadequate for the corrosion load. With the addition of the zinc as indicated in Table 2 a coating developed and immediate improvement was secured. The coating contained zinc phosphate and calcium. Its deposition was uniform, fine grained, adherent and independent of the surface condition, i.e., it deposited on metal and corrosion products alike. The coating was highly protective, permitting only 13 milligrams steel loss on an area of 3 square inches in 30 days for an average penetration of 0.0004 inch per year.

The coating deposition could be controlled by regulating the concentration of zinc and phosphate salts and the pH to prevent an excessively thick coating. The zinc coating in the presence of phosphate-chromate was found to be vastly superior to the coating of calcium carbonate, which has been widely used, because the zinc coating does not vary greatly in thickness over a range of temperature such as 100° F. whereas the calcium carbonate coating increases in thickness greatly with increase in temperature. In addition the zinc coating as developed in cooling water systems deposited uniformly over the entire surface irrespective of the surface conditions of the metal. The zinc coating deposited more quickly, more effectively and was more completely protective than the coating of calcium carbonate.

The effect of the zinc coating was to prevent tuberculation and pitting initially or to arrest them so as to provide satisfactory protection. Because of the high insolubility of the zinc coating and the excellent protective behavior of even very thin layers, together with the ease of coating control by regulating the zinc and phosphate concentrations and regulating the pH, the use of zinc type coatings was found to be vastly superior to any other treatment utilizing a similar mechanism such as the calcium carbonate deposit, widely applied for metal protection.

Further advantages of zinc when used with phosphate-chromate under conditions conducive to formation of a coating will be apparent when certain of the limitations of the phosphate-chromate treatment, without the zinc, are considered. As disclosed in copending application Serial No. 364,871, now U.S. Patent No. 2,711,391, the combination of phosphate and chromate gives superior control over corrosion due to pitting attack. For its most effective use, pH's in excess of 7.8 are not recommended, pH's in the range from 5.7 to 6.5 being recommended. Solubility of tricalcium phosphate often limits the concentration of total treatment containing phosphate and chromate to such an extent that it is not capable of meeting the corrosion load. Plants are reluctant to go below pH of 5.7 to increase their calcium tolerance and permit more adequate phosphate-chromate levels of treatment.

With the addition of zinc in accordance with the present invention, under coating conditions, the present applicants have found that the benefits of the phosphate-chromate type of treatment can be extended into a higher pH level, achieving good results up to pH 8.5. Above this pH, the zinc does not precipitate and the combined benefits are no longer attained.

Furthermore the present inventors have discovered that a phosphate-chromate combination having a concentration which is considered poor or effective only for light corrosion loads, can be made effective for much higher corrosion loads by adding zinc under conditions which produce a coating. This was in fact done in the tests referred to in Table 2.

Thus within the scope of the present invention zinc used in conjunction with phosphate and chromate has superior corrosion inhibitory power and broadens the range of successful application and improves the inhibitory power of phosphate-chromate formulation.

The zinc may be used in any form which will permit its complete solubility in feed solutions and make available for corrosion treatments those materials that subsequently in the main flow can perform their beneficial function as soluble inhibitors or as precipitated coatings to produce a protective coating or barrier. As little as 0.2 p.p.m. of zinc ion has been quite effective, and 10 p.p.m. has been distinctly beneficial. Concentrations of zinc as low as 0.1 p.pm. may be used with success, and except for expense, toxicity hazard or the like, if corrosion loads justify, concentrations of zinc ion as high as 100 p.p.m. may be employed. Usually 25 p.p.m. of zinc ion will be sufficient. The exact amount used will depend upon such factors as the solubility product of possible zinc salts, mode of use of the treatment, permissible material cost, corrosion feed, and in some cases need for more rapid initial protection.

Suitable zinc compounds to feed as soluble zinc salts are zinc acetate, zinc chloride, zinc formate, zinc nitrate, zinc permanganate, and zinc sulphate. Any other water soluble compounds of zinc may be used.

The pH range for zinc may be between 5 and 8.5, preferably between 5.5 and 8.2.

It is not possible to draw a simple dividing line between pH and concentrations at which zinc protects in solution and at which zinc protects by a precipitate as this depends upon the concentration of zinc and phosphate, both complex and ortho, as well as temperature.

The phosphates used herein include the complex or polyphosphates having molecular ratios of $Na_2O$ to $P_2O_5$ of between 1 to 1 and 2 to 1 and which are water soluble. Examples of suitable compounds of this character are sodium pyrophosphate, $Na_4P_2O_7$; sodium tripolyphosphate, $Na_5P_3O_{10}$; sodium tetraphosphate, $Na_6P_4O_{13}$; sodium septaphosphate, $Na_9P_7O_{22}$; sodium decaphosphate, $Na_{12}P_{10}O_{31}$ and sodium hexametaphosphate, $Na_6P_6O_{18}$. The corresponding potassium or ammonium salts may be used, or the corresponding molecularly dehydrated phosphoric acids such as metaphosphoric acid or pyrophosphoric acid. The complex phosphates are approximately 3 times as effective as orthophosphates. Examples of orthophosphates which may be used are monosodium phosphate, monopotassium phosphate, or any other water soluble orthophosphate, or phosphoric acid. In general the sodium, potassium and ammonium salts are most suitable, but any water soluble orthophosphate may be employed. Both a water soluble complex phosphate and a water soluble orthophosphate may be present.

Concentrations of phosphates down to 1 p.p.m. have been found effective, calculated as the water soluble phosphate salt used. The upper limit of phosphate must depend on whether or not precipitation in the main or treated flow is desired or is to be avoided. If precipitation is not a serious factor or is not to be limited, water soluble phosphate salt concentrations as high as 200 p.p.m. and more usually as high as 100 p.p.m. may be used. The amount of phosphate that can be tolerated will depend upon the amount of orthophosphate that will be present either by direct addition or as a reversion product from complex phosphate, together with the zinc concentration carried to provide treating conditions desired. For example at a given pH and zinc concentration, the upper limit of phosphate concentration will be established in many cases by the solubility product of zinc phosphate, and lower phosphate concentrations will be mandatory if completely soluble ionic conditions are to be maintained and higher phosphate concentrations will be necessary if precipitation is desired for a coating type protection.

Chromates used include compounds of alkali metals or any water soluble compound that contains chromium in hexavalent form and provides chromate radical in water solutions. Suitable materials for feeding chromate are sodium chromate dihydrate, $Na_2Cr_2O_7 \cdot 2H_2O$; sodium chromate anhydrous $Na_2CrO_4$; sodium chromate tetrahydrate, $Na_2CrO_4 \cdot 4H_2O$; sodium chromate hexahydrate, $Na_2CrO_4 \cdot 6H_2O$; sodium chromate decahydrate, $Na_2CrO_4 \cdot 10H_2O$; potassium dichromate, $K_2Cr_2O_7$; potassium chromate, $K_2CrO_4$; ammonium dichromate $(NH_4)_2Cr_2O_7$ and chromic acid $CrO_3$. Chromate concentrations may be used over a wide range. Benefit has been found from as little as 1 p.p.m. of sodium dichromate or sodium chromate or other water soluble chromate salt in such a cooling water. No harm is done by increasing concentrations of chromate provided objection is not caused by cost, toxicity or similar factors. Thus concentrations of chromate as high as 500 p.p.m. of sodium chromate, sodium dichromate or other water soluble chromate salt may be used, although an upper limit of 200 p.p.m. is more usual in the invention.

In view of our invention and disclosure variations and modifications to meet individual whim or particular need will doubtless become evident to others skilled in the art, to obtain all or part of the benefits of our invention without copying the process and composition shown, and we, therefore, claim all such insofar as they fall within the reasonable spirit and scope of our claims.

It will be evident that combined advantages can be used by incorporating cadmium according to the continuation application along with the zinc in conjoint use with phosphate and chromate.

Table 1

| Phosphate as Actophos, p.p.m. | Chromate as Sodium Dichromate, p.p.m. | Zinc ion, p.p.m. | Ave. P., In./Yr. | pH | Tubercles | Pits |
|---|---|---|---|---|---|---|
| 10 | 5 | 10 | 0.002 | 6.0 | Few, tiny | Minute. |
| 10 | 5 | ----- | 0.004 | 6.0 | Numerous | Numerous. |
| 10 | 5 | 10 | -------- | 6.0 | Some, tiny | No definite pitting. |
| 4 | 2 | 4 | -------- | 6.0 | Couple | Do. |
| 4 | 2 | ----- | -------- | 6.0 | 30% of area attacked continuously. | |
| 60 | 30 | 10 | -------- | 6.0 | None | No definite pitting. |
| 60 | 30 | ----- | -------- | 6.0 | None | None. |
| 2 | 1 | 2 | 0.030 | 6.0 | Anodic area | General attack. |
| 2 | 1 | ----- | 0.053 | 6.0 | ------do------ | Do. |
| --------- | ------- | 10 | 0.016 | 6.0 | ------do------ | Numerous, some aggressive. |

Table 2

| Sodium Tripoly-Phosphate, p.p.m. | Disodium Phosphate, p.p.m. | Sodium Dichromate, p.p.m. | $Zn^{++}$, p.p.m.[1] | pH | Ave. P., In./Yr. | Tubercles | Pits |
|---|---|---|---|---|---|---|---|
| 5 | 1.5 | 15 | ------ | 7.4 | 0.004 | Numerous | Numerous, shallow. |
| 5 | 1.5 | 15 | 1.2 | 7.4 | 0.001 | (²) | Minute. |

[1] Supplied by zinc chloride.
[2] Tubercles so small as to be difficult to identify as such under the microscope.

Having thus described our invention what we claim as new and desire to secure by Letters Patent is:

1. The process of protecting against corrosion the metal parts in a cooling water system, which comprises flowing water in a stream through the cooling water system and maintaining the water continuously in contact with the metal parts, adding to the water between 1 and 200 p.p.m. of a water soluble phosphate compound, between 1 and 500 p.p.m. of a water soluble chromate compound and a water soluble zinc compound, the concentration of zinc ion being between 0.1 and 25 p.p.m., while maintaining a pH in the range between 5 and 8.5.

2. The process of claim 1, which comprises depositing a protective coating of zinc compound on the metal parts.

3. The process of claim 1, in which the pH is in the range between 5.5 and 8.2.

4. The process of claim 1, in which the concentration of water soluble phosphate compound is between 1 and 100 p.p.m., the concentration of water soluble chromate compound is between 1 and 200 p.p.m., and the concentration of zinc ion is between 0.2 and 25 p.p.m.

5. The process of claim 1, in which the water soluble phosphate is a complex phosphate.

6. The process of claim 1, in which the water soluble phosphate is an orthophosphate.

7. The process of claim 1, in which the water soluble phosphate is a complex phosphate and an orthophosphate.

8. The process of claim 1, in which zinc is added and under the conditions remains soluble in the water.

References Cited in the file of this patent

UNITED STATES PATENTS

| | | |
|---|---|---|
| 2,126,430 | Unger | Aug. 9, 1938 |
| 2,299,748 | Hatch | Oct. 27, 1942 |
| 2,499,261 | Rosenbloom | Feb. 28, 1950 |
| 2,554,139 | Drysdale | May 22, 1951 |
| 2,560,331 | Buchan | July 10, 1951 |
| 2,673,817 | Burns | Mar. 30, 1954 |
| 2,711,391 | Kahler | June 21, 1955 |

FOREIGN PATENTS

| | | |
|---|---|---|
| 368,619 | Great Britain | Mar. 10, 1932 |

OTHER REFERENCES

Laudermilk: The Oil and Gas Jour., December 7, 1946, pp. 105–110 (p. 106 pert.).

Pray et al.: The Producers' Monthly, September 1946, pp. 11–23.